(12) United States Patent
Yu

(10) Patent No.: US 9,103,695 B2
(45) Date of Patent: Aug. 11, 2015

(54) DETECTION CIRCUIT FOR DETECTING SIGNALS PRODUCED BY BRIDGE CIRCUIT SENSOR

(75) Inventor: Qi-Long Yu, Guangdong (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 508 days.

(21) Appl. No.: 13/610,775

(22) Filed: Sep. 11, 2012

(65) Prior Publication Data

US 2013/0211755 A1 Aug. 15, 2013

(30) Foreign Application Priority Data

Feb. 13, 2012 (CN) .......................... 2012 1 0031107

(51) Int. Cl.
*G01R 19/00* (2006.01)
*G01D 3/02* (2006.01)

(52) U.S. Cl.
CPC ...................... *G01D 3/02* (2013.01)

(58) Field of Classification Search
CPC .......................................... G01D 3/02
See application file for complete search history.

(56) References Cited

U.S. PATENT DOCUMENTS 4,971,049 A * 11/1990 Rotariu et al. ............ 128/204.21

* cited by examiner

*Primary Examiner* — Aditya Bhat
(74) *Attorney, Agent, or Firm* — Novak Druce Connolly Bove + Quigg LLP

(57) ABSTRACT

A detection circuit includes an amplifier circuit, a rechargeable unit, a first comparator, a second comparator, a reference voltage providing circuit, a first resistor R1, a second resistor R2, and a processing unit. The amplifier circuit is connected to a bridge circuit sensor and amplifies signals output by the bridge circuit sensor to an output voltage Vo. The reference voltage providing circuit provides a reference voltage Vref1. A charge current of the rechargeable unit is (Vref1−V0)/(R1+R2), and a discharge current is (Vref1−VCC)/R1. The processing unit controls the rechargeable unit to be charged for a time period T1 and to be discharged during a time period T2. The processing unit then calculates the output voltage Vo according to an equation: (Vref1−V0)×T1/(R1+R2)= (Vref1−VCC)×T2/R1, and obtains the signals according to the output voltage Vo.

12 Claims, 2 Drawing Sheets

DETECTION CIRCUIT FOR DETECTING SIGNALS PRODUCED BY BRIDGE CIRCUIT SENSOR

BACKGROUND

1. Technical Field

The present disclosure relates to detection circuits and, particularly, to a detection circuit for detecting signals produced by a bridge circuit sensor.

2. Description of Related Art

Sensors are commonplace in electronic devices. The types of sensor may include a pressure sensor, a capacitance sensor, a bridge circuit sensor, and the like. The sensors detect a change in parameter, such as the pressure value and the capacitance value, and produce corresponding signals, and a circuit detects/receives signals and takes corresponding action. However, for the bridge circuit sensor, an amplifier and a high precision analog to digital (A/D) converter are needed to sense the signals produced by the bridge circuit sensor. The high precision A/D converter is expensive.

An electronic device and a method, to overcome the described limitations are thus needed.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will be described with reference to the accompanying drawings.

Figure 1:
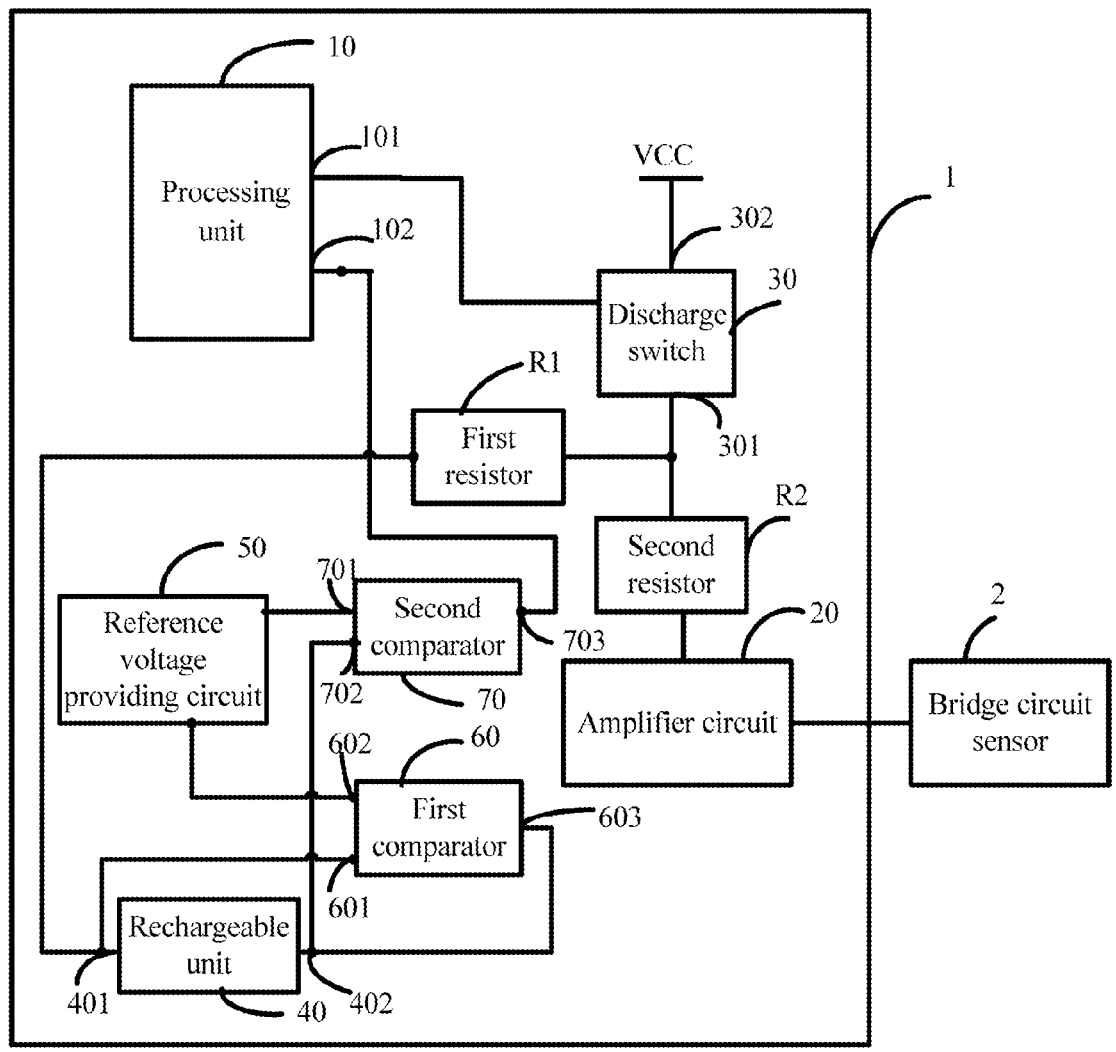
FIG. 1 is a block diagram of a detection circuit for detecting signals produced by a bridge circuit sensor, in accordance with an exemplary embodiment.

Referring to FIG. 1, an embodiment of a detection circuit 1 for detecting signals produced by a bridge circuit sensor 2 is illustrated.

The detection circuit 1 includes a processing unit 10, an amplifier circuit 20, a discharge switch 30, a rechargeable unit 40, a reference voltage providing circuit 50, a first comparator 60, a second comparator 70, a first resistor R1, and a second resistor R2.

The first comparator 60 includes an inverting input port 601, a non-inverting input port 602, and an output port 603. The second comparator 70 includes an inverting input port 701, a non-inverting input port 702, and an output port 703.

The rechargeable unit 40 includes a first terminal 401 and a second terminal 402. The first terminal 401 is electrically connected to the first resistor R1 and the second resistor R2. The first terminal 401 is also connected to the inverting input port 601 of the first comparator 60. The second terminal 402 of the rechargeable unit 40 is connected to the output port 603 of the first comparator 60 and the non-inverting input port 702 of the second comparator 70. The output port 703 of the second comparator 70 is connected to the processing unit 10.

The reference voltage providing circuit 50 is connected to the non-inverting input port 602 of the first comparator 60 and the inverting input port 701 of the second comparator 70. The reference voltage providing circuit 50 provides a first reference voltage Vref1 to the non-inverting input port 602 of the first comparator 60, and provides a second reference voltage Vref2 to the inverting input port 701 of the second comparator 70.

The amplifier circuit 20 is connected to the bridge circuit sensor 2 and receives the signals produced by the bridge circuit sensor 2. In the embodiment, the signals produced by the bridge circuit sensor 2 are voltages. The amplifier circuit 20 is used to amplify the voltages and obtain an output voltage Vo. In the embodiment, the first reference voltage Vref1 is greater than the second reference voltage Vref2, and the output voltage Vo is between the first reference voltage Vref1 and the second reference voltage Vref2.

The processing unit 10 is connected to a first terminal 301 of the discharge switch 30, and switches the discharge switch 30 on or off. In the embodiment, the discharge switch 30 is connected between a voltage port VCC and a connection node of the first resistor R1 and the second resistor R2.

When the discharge switch 30 is turned on, the rechargeable unit 40 is discharged via the first resistor R1 and the turned-on discharge switch 30, and a discharged current Id is equal to a value obtained by dividing a resistance value of the first resistor R1 by a voltage difference between the first reference voltage Vref1 and a voltage of the voltage port VCC. By way of example, assume the resistance value of the first resistor R1 is R1, and the voltage of the voltage port VCC is VCC, then the discharged current is Id=(Vref1−VCC)/R1. When the discharge switch 30 is turned off, the rechargeable unit 40 is charged, and a charge current Ic is a value obtained by dividing resistance values of the first resistor R1 and the second resistor R2 by a voltage difference between the first reference voltage Vref1 and the output voltage Vo. If the resistance value of the second resistor R2 is R2, then the charge current is Ic=(Vref1−Vo)/(R1+R2).

When the detection circuit 1 receives signals from the bridge circuit sensor 2, the first terminal 401 of the rechargeable unit 40 is electrically connected to the amplifier circuit 20, and obtains the output voltage Vo from the amplifier circuit 20. As described above, because the output voltage V0 is less than the first reference voltage Vref1 but greater than the second reference voltage Vref2, the first comparator 60 outputs a high voltage. At the same time, the processing unit 10 controls the discharge switch 30 to turn on, the rechargeable unit 40 is discharged, therefore, the voltage of the second terminal 402 is decreased accordingly.

When the voltage of the second terminal 402 is decreased to a value which is less than the second reference voltage Vref2, the output port 703 of the second comparator 70 outputs a low voltage signal (hereinafter: the first low voltage signal). The processing unit 10 controls the discharge switch 30 to turn off when receiving the first low voltage signal, then the rechargeable unit 40 is charged accordingly, and the voltage of the second terminal 402, through the output port 603 of the first comparator 60, is increased accordingly.

The processing unit 10 also starts to time when receiving the first low voltage signal, and controls the discharge switch 30 to turn on and restarts to time when the time is equal to a predetermined time period T1. When the discharge switch 30 is turned on, the rechargeable unit 40 is discharged again. As described above, when the rechargeable unit 40 is discharged, the voltage of the second terminal 402 is decreased, and when the voltage of the second terminal 402 is less than the second reference voltage Vref2, the second comparator 70 outputs the low voltage signal (hereinafter: the second low voltage signal) to the processing unit 10 again. The processing unit 10 stops timing and obtains a time period T2 when receiving the second low voltage signal.

In the embodiment, the voltage of the first terminal 401 of the rechargeable unit 40 remains unchanged, and the rechargeable unit 40 is charged during the time period T1, the voltage of the second terminal 402 is thus increased from the second reference voltage Vref2 to a certain voltage. And when the rechargeable unit 40 is discharged in the time period T2, the voltage of the second terminal 402 is decreased from the certain voltage to the second reference voltage Vref2. Therefore, the amount of charge built up in the time period T1 is equal to the amount of charge discharged in the time period T2.

As described above, the discharged current Id of the rechargeable unit 40 is (Vref1−VCC)/R1 and the charge current Ic of the rechargeable unit 40 is (Vref1−V0)/(R1+R2), therefore, the amount of charge built up in the time period T1 is (Vref1−Vo)×T1/(R1+R2), and the amount of charge discharged in the time period T2 is (Vref1−VCC)*T2/R1, therefore, an equation is established: (Vref1−Vo)×T1/(R1+R2)=(Vref1−VCC)*T2/R1.

The processing unit 10 calculates the output voltage Vo according to the equation, and obtains the signals produced by the bridge circuit sensor 2 according to the output voltage Vo.

Figure 2:
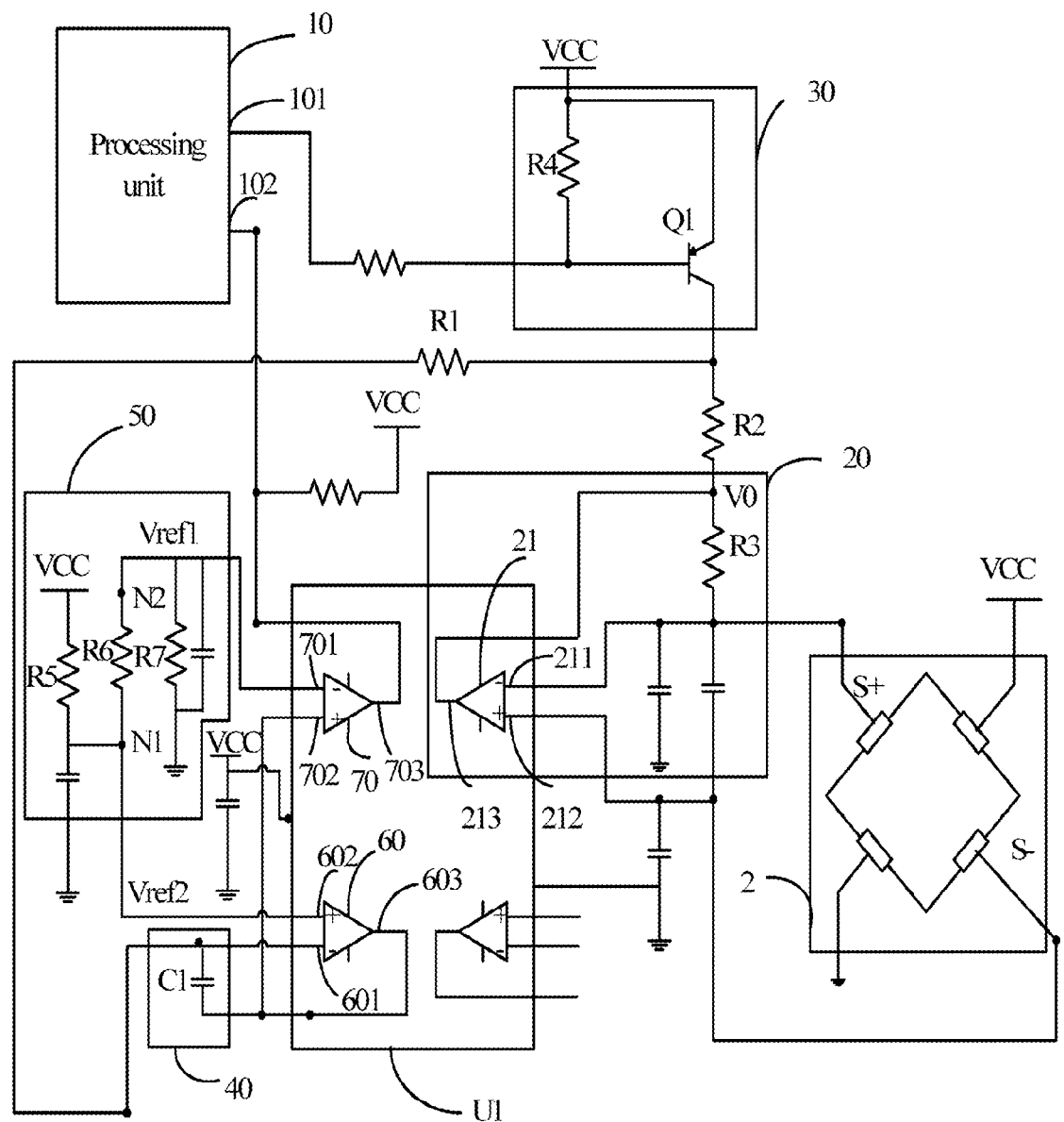
FIG. 2 is a circuit diagram of the detection circuit of FIG. 1.

Referring to FIG. 2, in the embodiment, the bridge circuit sensor 2 includes two output terminals S+ and S−. When the bridge circuit sensor 2 senses different parameters, such as different pressures, there is a voltage difference between the two output terminals S+ and S−.

The amplifier circuit 20 includes an operational amplifier 21 and a resistor R3. The operational amplifier 21 includes a first input port 211, a second input port 212, and an output port 213. The first input port 211 is connected to the output terminal S+, and the second input port 212 is connected to the output terminal S−. The resistor R3 is connected between the first input terminal 211 and the output port 213 of the operational amplifier 21. The operational amplifier 21 amplifies the voltage difference between the two output terminals S+ and S− to obtain the output voltage Vo, and outputs the output voltage Vo via the output port 213.

In the embodiment, assuming a resistance value of the bridge circuit sensor 2 is Rb, and the resistance value of the resistor R3 is R3, the amplification factor of the operational amplifier 21 is R3/2Rb. That is, the output voltage Vo is R3/2Rb times the voltage difference between the two output terminals S+ and S−.

The discharge switch 30 includes a low voltage activated switch Q1 and a resistor R4, the low voltage activated switch Q1 includes a control terminal (not labeled), a first path terminal (not labeled), and a second path terminal (not labeled). In the embodiment, the low voltage activated switch Q1 is a positive-negative-positive bipolar junction transistor (PNP BJT) Q1, a base, an emitter, and a collector of the PNP BJT Q1 respectively corresponds to the control terminal, the first path terminal, and the second path terminal of the low voltage activated switch Q1. In another embodiment, the low voltage activated switch Q1 can be a P-channel metal oxide semiconductor field effect transistor (PMOSFET).

The resistor R4 is connected between the base of the PNP BJT Q1 and the voltage port VCC. The processing unit 10 includes a control pin 101 and an interrupt pin 102. The control pin 101 is connected to the base of the PNP BJT Q1, the emitter of the PNP BJT Q1 is connected to the voltage port VCC, the collector of the PNP BJT Q1 is connected to the first terminal 401 of the rechargeable unit 40 via the first resistor R1, and is also connected to the output port 213 of the operational amplifier 21 via the second resistor R2.

In the circuit, the rechargeable unit 40 is a capacitor C1, the reference voltage providing circuit 50 includes resistors R5, R6, and R7 which are connected in series between the voltage port VCC and ground. A connection node N1 between the resistors R5, R6 is connected to the non-inverting input port 602 of the first comparator 60 and provides the first reference voltage Vref1 to the non-inverting input port 602 of the first comparator 60. A connection node N2 between the resistors R6 and R7 is connected to the inverting input port 701 of the second comparator 70, and provides the second reference voltage Vref2 to the inverting input port 701 of the second comparator 70.

The interrupt pin 102 of the processing unit 10 is connected to the output port 703 of the second comparator 70, and receives the first or second low voltage signal output by the second comparator 70. When the processing unit 10 receives the first or second low voltage signal via the interrupt pin 102, the processing unit 10 outputs a high voltage signal to the base of the PNP BJT Q1 via the control pin 101 and controls the PNP BJT Q1 to turn off, then the capacitor C1 is charged. At this time, the first comparator 60 is in a linear region, the voltage of the non-inverting input port 602 is equal to the voltage of the inverting input port 601 of the first comparator 60, and then the voltage of the first terminal 401 connected to the inverting input port 601 is equal to the first reference voltage Vref1. Thus, the charge current Ic=(Vref1−V0)/(R1+R2).

As described above, the processing unit 10 starts to time when receiving the first low voltage signal, and controls the discharge switch 30 to turn on and restarts to time when the time is equal to a predetermined time period T1. When the discharge switch 30 is turned on, the rechargeable unit 40 is discharged, the voltage of the second terminal 402 is decreased, and when the voltage of the second terminal 402 is less than the second reference voltage Vref2, the second comparator 70 outputs the second low voltage signal to the processing unit 10. The processing unit 10 stops timing and obtains the time period T2 when receiving the second low voltage signal via the interrupt pin 102. During the discharge process, the first comparator 60 remains in a linear region, then the voltage of the first terminal 401 connected to the inverting input port 601 is always the first reference voltage Vref1. Thus, the discharge current is (Vref1−VCC)/R1.

As described above, the equation: (Vref1−Vo)×T1/(R1+R2)=(Vref1−VCC)×T2/R1 is established. The processing unit 10 calculates the output voltage Vo according to the equation. The processing unit 10 processes the signals produced by the bridge circuit sensor 2 by reference to the calculated output voltage Vo. In the embodiment, the processing unit 10 stores the resistance values of the resistor R1 and R2, the first reference voltage Vref1, the second reference voltage Vref2, and the time periods T1 and T2. The processing unit 10 calculates the output voltage Vo according to the equation and the stored resistance values of the resistors R1 and R2, the first reference voltage Vref1, the second reference voltage Vref2, and the time periods T1 and T2.

In the embodiment, the first comparator 60, the second comparator 70, and the operation amplifier 21 all are encapsulated in one chip U1. In another embodiment, the first comparator 60, the second comparator 70, and the operation amplifier 21, the second comparator 70, and the operation amplifier 21 can be discrete and not encapsulated in the chip U1.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A detection circuit for detecting signals produced by a bridge circuit sensor, comprising:
an amplifier circuit, configured to amplify the signals produced by the bridge circuit sensor and output an output voltage Vo corresponding the signals;
a first resistor R1 and a second resistor R2;
a first comparator comprising a first inverting input port, a first non-inverting input port, and a first output port;
a second comparator comprising a second inverting input port, a second non-inverting input port, and a second output port;
a rechargeable unit comprising a first terminal and a second terminal, wherein, the first terminal is electrically connected to the amplifier circuit via the first resistor R1 and the second resistor R2 and is further connected to the first inverting input port, the second terminal is connected to both of the first output port and the second non-inverting input port;
a reference voltage providing circuit, connected to the first non-inverting input port of the first comparator and the second inverting input port of the second comparator, configured to provide a first reference voltage Vref1 to the first non-inverting input port, and provide a second reference voltage Vref2 to the second inverting input port;
a discharge switch, connected between a voltage port VCC and a connection node of the first resistor R1 and the second resistor R2; and
a processing unit, connected to the discharge switch and the second output port of the second comparator;
wherein, when the detection circuit receives the signals from the bridge circuit sensor, the processing unit controls the discharge switch to turn on, the rechargeable unit is discharged via the first resistor R1 and the turned on discharge switch, and a discharged current is (Vref1−VCC)/R1, a voltage of the second terminal of the rechargeable unit is decreased when the rechargeable unit is discharged, when the voltage of the second terminal is decreased to a value less than the second reference voltage Vref2, the second output port outputs a first low voltage signal to the processing unit, the processing unit controls the discharge switch to turn off and starts to time when receiving the first low voltage signal, then the rechargeable unit is charged via the first resistor R1 and the second resistor R2, and the charge current is (Vref1−Vo)/(R1+R2); the processing unit further controls the discharge switch to turn on and restarts to time when the time is equal to a first time period T1, then the rechargeable unit is discharged again and the voltage of the second terminal of the rechargeable unit is decreased gradually, and the second output port outputs the second low voltage signal again when the voltage of the second terminal is less than the second reference voltage Vref2, when the processing unit receives the second low voltage signal, the processing unit stops timing and obtains a second time period T2; wherein, the processing unit calculates the output voltage Vo according to an equation: (Vref1−Vo)×T1/(R1+R2)=(Vref1−VCC)*T2/R1, and then obtains the sense signal according to the calculated output voltage Vo.

2. The detection circuit according to claim 1, wherein the bridge circuit sensor comprises two output terminals, the amplifier circuit comprises an operational amplifier, and a third resistor; the operational amplifier comprises a first input port, a second input port, and a third output port, the first input port and the second input port are connected to the two output terminals respectively, the third resistor is connected between the first input terminal and the output port of the operational amplifier, the operational amplifier amplifies a voltage difference between the two output terminals to obtain the output voltage Vo, and outputs the output voltage Vo via the third output port.

3. The detection circuit according to claim 1, wherein the discharge switch comprises a low voltage activated switch and a fourth resistor, the low voltage activated switch comprises a control terminal, a first path terminal and a second path terminal, the processing unit comprises a control pin; the fourth resistor is connected between the control terminal and the first path terminal, the control pin is connected to the control terminal of the low voltage activated switch, the first path terminal of the low voltage activated switch is further connected to the voltage port VCC, the second path terminal of the low voltage activated switch is connected to the first terminal of the rechargeable unit via the first resistor R1, and is connected to the amplifier circuit via the second resistor.

4. The detection circuit according to claim 3, wherein the low voltage activated switch is a positive-negative-positive bipolar junction transistor or a P-channel metal oxide semiconductor field effect transistor.

5. The detection circuit according to claim 3, wherein the processing unit further comprises an interrupt pin, the interrupt pin is connected to the second output port of the second comparator, when the voltage of the second terminal of the rechargeable unit is less than the second reference voltage, the second output port outputs the first low voltage signal to the interrupt pin of the processing unit, the processing unit outputs a high voltage signal to the control terminal of the low voltage activated switch via the control pin to turn the low voltage activated switch when receiving the first low voltage signal.

6. The detection circuit according to claim 1, wherein the rechargeable unit is a capacitor.

7. The detection circuit according to claim 1, wherein the reference voltage providing circuit comprises a fifth resistor, a sixth resistor, and a seventh resistor which are connected between the voltage port VCC and ground in series, a connection node between the fifth resistor and the sixth resistor is connected to the first non-inverting input port of the first comparator and provides the first reference voltage Vref1 to the first non-inverting input port, a connection node between the sixth resistor, and the seventh resistor is connected to the second inverting input port of the second comparator, and provides the second reference voltage Vref2 to the second inverting input port.

8. The detection circuit according to claim 1, wherein the processing unit is further configured to determine the signals produced by the bridge circuit sensor according to the calculated output voltage Vo, and execute a corresponding action corresponding to the signals.

9. The detection circuit according to claim 1, wherein the signals produced by the bridge circuit sensor are in a form of voltage.

10. The detection circuit according to claim 1, wherein the processing unit stores values comprising resistance values of the first, second resistors R1, R2, the first reference voltage Vref1, the second reference voltage Vref2, the time periods T1, and T2, the processing unit calculates the output voltage Vo according to an equation: $(Vref1-Vo) \times T1/(R1+R2) = (Vref1-VCC) * T2/R1$ and the stored values.

11. The detection circuit according to claim 1, wherein the first comparator is in a linear region when the rechargeable unit is charged, a voltage of the first non-inverting input port is equal to a voltage of the first inverting input port of the first comparator, then the voltage of the first terminal of the rechargeable unit connected to the first inverting input port is equal to the first reference voltage Vref1, and the charge current is $(Vref1-V0)/(R1+R2)$.

12. The detection circuit according to claim 1, wherein the first comparator is in a linear region when the rechargeable unit is discharged, a voltage of the first non-inverting input port is equal to a voltage of the first inverting input port of the first comparator, then the voltage of the first terminal of the rechargeable unit connected to the first inverting input port is equal to the first reference voltage Vref1, and the discharge current is $(Vref1-VCC)/R1$.

* * * * *